(12) United States Patent
Zhang et al.

(10) Patent No.: US 11,798,018 B2
(45) Date of Patent: Oct. 24, 2023

(54) EFFICIENT FEATURE SELECTION FOR PREDICTIVE MODELS USING SEMANTIC CLASSIFICATION AND GENERATIVE FILTERING

(71) Applicant: ADOBE INC., San Jose, CA (US)

(72) Inventors: Wei Zhang, Great Falls, VA (US); Shiladitya Bose, Kolkata (IN); Said Kobeissi, Lovettsville, VA (US); Scott Allen Tomko, Leesburg, VA (US); Jeremy W King, Aldie, VA (US)

(73) Assignee: Adobe Inc., San Jose, CA (US)

( * ) Notice: Subject to any disclaimer, the term of this patent is extended or adjusted under 35 U.S.C. 154(b) by 1316 days.

(21) Appl. No.: 15/062,937

(22) Filed: Mar. 7, 2016

(65) Prior Publication Data

US 2017/0255952 A1    Sep. 7, 2017

(51) Int. Cl.
```
G06N 20/00       (2019.01)
G06Q 30/0204     (2023.01)
G06Q 10/0639     (2023.01)
G06Q 50/00       (2012.01)
G06F 16/9535     (2019.01)
G06F 16/35       (2019.01)
G06N 3/08        (2023.01)
G06N 3/044       (2023.01)
G06N 3/045       (2023.01)
```
(52) U.S. Cl.
CPC ......... *G06Q 30/0205* (2013.01); *G06F 16/35* (2019.01); *G06F 16/9535* (2019.01); *G06Q 10/06395* (2013.01); *G06Q 50/01* (2013.01); *G06N 3/044* (2023.01); *G06N 3/045* (2023.01); *G06N 3/08* (2013.01)

(58) Field of Classification Search
None
See application file for complete search history.

(56) References Cited

U.S. PATENT DOCUMENTS

| | | | | |
|---|---|---|---|---|
| 7,318,051 B2 * | 1/2008 | Weston | ............... | G06F 18/2113 |
| | | | | 706/12 |
| 7,499,897 B2 * | 3/2009 | Pinto | ..................... | G06Q 30/02 |
| | | | | 706/11 |
| 8,452,778 B1 * | 5/2013 | Song | ................... | G06F 16/7844 |
| | | | | 707/748 |

FOREIGN PATENT DOCUMENTS

EP       3260943 A1 *  12/2017  ........... G05B 23/024

OTHER PUBLICATIONS

Khun, Applied Predictive modeling, SPRINGER, https://link.springer.com/content/pdf/10.1007/978-1-4614-6849-3.pdf, p. 487-500) (Year: 2013).*

(Continued)

*Primary Examiner* — Hajime Rojas
*Assistant Examiner* — Alfred H Tsui
(74) *Attorney, Agent, or Firm* — SHOOK, HARDY & BACON L.L.P.

(57) ABSTRACT

Systems and methods provide for feature selection that combines semantic classification and generative filtering with forward selection. Features from an original feature set are divided into feature subsets corresponding to ranked semantic classes. Additionally, low quality features are removed from consideration. Features are selected for a reduced feature set by iteratively processing the feature subsets using forward selection in an order corresponding to the ranking of the semantic classes. The reduced feature set is used to generate a predictive model.

20 Claims, 6 Drawing Sheets

(56) References Cited

OTHER PUBLICATIONS

Chandrashekar, Girish, A survey on feature selection methods, Rochester Institute of Technology, Dec. 7, 2013 (https://www.sciencedirect.com/science/article/pii/S0045790613003066) (p. 16, 17, 18, 19 and 27) (Year: 2013).*
Huang, Samuel, Supervised feature selection: tutorial, Sciedu.ca, Published: Apr. 9, 2015 https://www.researchgate.net/profile/Samuel-Huang-3/publication/275228384_Supervised_feature_selection_A_tutorial/links/5a1d720f0f7e9b2a531726a3/Supervised-feature-selection-A-tutorial.pdf (retrieved Sep. 8, 2021) (Year: 2015).*
Author(s):Wu Yimin. Title:Feature selection for classifying high dimensional numberical data Journal:IEEE[online]. Publication date:2004.[retrieved on: Jun. 1, 2022 ]. Retrieved from the Internet: < URL:https://ieeexplore.ieee.org/stamp/stamp.jsp?tp=&arnumber=1315171> (Year: 2004).*
Author(s): Krause, J. Title:Feature selection for predictive modeling of high dimensional Journal:IEEE[online]. Publication date: 2014. [retrieved on:May 4, 2023 ]. Retrieved from the Internet: <URL:https://ieeexplore.ieee.org/abstract/document/6876047 (Year: 2014).*
Author(s):DAS, Sammy Title: "Filters, wrappers and boosted hybrid feature selection" Journal:HARVARD[online]. Publication date:2001. [retrieved on:Jul. 13, 2023 ]. Retrieved from the Internet: < URL: https://citeseerx.ist.psu.edu/document?repid=rep1&type=pdf&doi=127b12cb0052511ecd2e6a64931ccef50eba1c7e> (Year: 2001).*
Author(s):Naseriparsa, Mehdi Title: "A hybrid feature selection method . . . " Journal:ARXIV [online]. Publication date:2013. [retrieved on:Jul. 13, 2023 ]. Retrieved from the Internet: < URL: https://arxiv.org/ftp/arxiv/papers/1403/1403.2372.pdf> (Year: 2013).*
Author(s):Chandrashekar, Girish Title: "A survey on feature selection methods . . . " Journal:RIT [online]. Publication date: Dec. 2013.[retrieved on:Jul. 13, 2023 ]. Retrieved from the Internet: < URL: https://www.sciencedirect.com/science/article/pii/S0045790613003066 > (Year: 2013).*
Isabelle Guyon, André Elisseeff, "An Introduction to Variable and Feature Selection". 3(Mar):1157-1182, 2003.
Jiliang Tang, Salem Alelyani and Huan Liu, "Feature Selection for Classification: a Review", 2014.
Salem Alelyani, Jiliang Tang and Huan Liu, "Feature Selection for Clustering: a Review", 2014.
Senliol, Baris, et al. "Fast Correlation Based Filter (FCBF) with a different search strategy." ISCIS'08. 23rd International Symposium on. IEEE, 2008.

\* cited by examiner

EFFICIENT FEATURE SELECTION FOR PREDICTIVE MODELS USING SEMANTIC CLASSIFICATION AND GENERATIVE FILTERING

BACKGROUND

Online marketing tools provide marketers with predictive capabilities, such as identifying valuable customers or estimating the likelihood that a product will be purchased. The predictive capabilities are provided by predictive models, which are typically built using customer data. Often, a large amount of customer data is available for building these predictive models. In some cases, the customer data can include hundreds of features regarding each customer.

For most prediction tasks, the ability to make accurate predictions is determined by smaller sets of influential features, and the remaining features have little to no impact on the predictive capabilities. As a result, using all features for prediction is not a good approach. In particular, the massive number of irrelevant features will incur unnecessarily heavy computational costs. Moreover, the irrelevant features may cause overfitting that leads to adverse results.

In an attempt to avoid using irrelevant features, one current solution includes requiring a user to select a subset of features as input to a predictive model. However, it is extremely challenging for the user to understand the vast number of available features. Therefore, requiring a user to input selected features is a hindrance for common users. Typically, only a domain expert can select a sensible set of features. However, there is no guarantee that even inputs from a domain expert will generate a predictive model that provides accurate predictions.

Another solution currently used to avoid using all features when building predictive models is to employ automated feature selection techniques, such as forward selection. Forward selection includes iteratively testing the addition of each feature in building a predictive model and adding the feature that best improves the model at each iteration until minimal or no improvement is gained from adding any additional features. While this improves performance, such feature selection techniques can be slow, especially when there are a large number of features.

SUMMARY

Embodiments of the present invention relate to automated feature selection approaches that combine semantic classification and generative filtering with forward selection to achieve high efficiency without sacrificing prediction performance. In accordance with embodiments described herein, features from an original set of features are divided into feature subsets corresponding to ranked semantic classes. Additionally, low quality features likely to have little to no effect on a predictive model are filtered out. The feature subsets are iteratively processed using forward selection in an order corresponding to the ranking of the semantic classes to select features for a reduced feature set. The reduced feature set is then used to build a predictive model.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
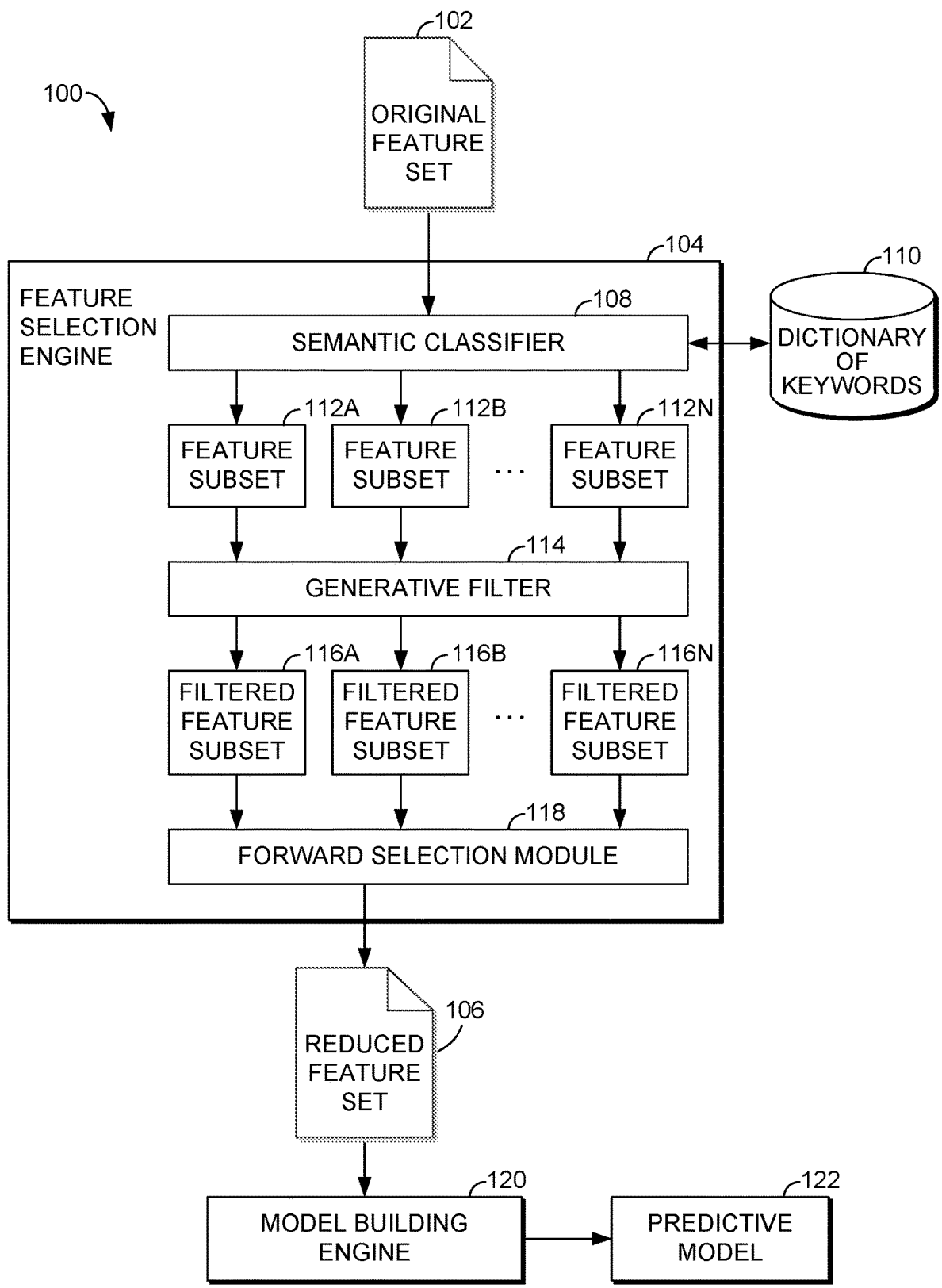
FIG. 1 is a block diagram illustrating an exemplary system in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

As used herein, the term "feature" refers to an attribute of a dataset that may be used when building a predictive model. In the context of digital marketing, a feature is any attribute describing customers in customer data, such as: features that describe customer traits (e.g., demographics of a customer, such as age, gender, geo location, and language); features regarding the computing device used by customers to access marketing resources (e.g., browser used, operating system used, mobile or desktop device, etc.); features identifying a social channel used by customers (e.g., the FACEBOOK, TWITTER, GOOGLE PLUS social networks) to interact with marketing resources; customer actions (e.g., click, view, download, purchase, additions, removal, and search); and temporal features describing some aspect regarding time. Features can be categorical values (e.g., United States, Brazil, etc. as categorical values for a Country feature; or www.google.com, www.yahoo.com, etc. as categorical values for a Referring Domain feature). Alternatively, features can be continuous (numeric) values (e.g., Revenue, Count of Orders, Number of times someone activated a device, etc.).

The term "semantic class" refers to a category of features that are logically related. By way of example and as will be described in further detail below, semantic classes in the context of digital marketing may include: customer traits (e.g., demographics); customer source (e.g., features of customers' computing devices); social channels (e.g., social networks used by customers to interact with marketing resources); customer actions (e.g., actions with marketing resources and products); and temporal (e.g., time-related features).

The term "feature quality score" refers to a metric that reflects the ability of a feature to segment a customer population or otherwise impact predictive capabilities of a predictive model. By way of example only and not limitation, a feature quality score for a feature can be based on a correlation between a feature and a predictive outcome (e.g., purchasing a product). As another example, a feature quality score can be based on an entropy measure reflecting the variance in a feature (e.g., a feature with low entropy/variance will have little impact on predictive capabilities).

The term "forward selection" refers to selection of features from a feature set in a stepwise fashion. Each iteration of forward selection includes testing the addition of each remaining feature in the feature set with previously selected features (if any) to determine which remaining feature best improves the predictive capability of the predictive model being built. The feature that best improves the predictive model (if any) is added to the group of selected features. This process of selecting features is continued until none of the remaining features improves the predictive model. This could include stopping when the improved performance is minimal or below some threshold.

The term "predictive model" refers to a model used to predict an outcome given a set of input characteristics. For example, a predictive model could be directed to determining the likelihood of a customer purchasing a product given information regarding the customer. A predictive model can be built from features from a dataset using any of a variety of known machine-learning algorithms.

While a large number of features may be available from a dataset for building predictive models, using all features is computationally expensive and causes overfitting, which provides less accurate predictions. Accordingly, automated feature selection techniques are often employed to select a reduced feature set, which is in turn used to generate a predictive model. Brute force ways of evaluating all possible feature combinations for reduced feature sets are prohibitive, so automated feature selection often employs greedy search, such as forward selection and backward elimination. These greedy search techniques provide some computational advantage and are robust against overfitting. However, even greedy search techniques suffer from heavy computational cost when the number of available features is large.

Embodiments of the present invention relate to an automated feature selection approach that combines semantic classification and generative filtering techniques with forward selection to achieve high efficiency without sacrificing prediction performance. An original feature set is divided into multiple feature subsets corresponding to semantic classes relevant to the dataset. The semantic classes are ranked based on the likelihood that features in each semantic class will impact predictive capabilities. Generative filtering is also used to remove low quality features from consideration. Low quality features are features likely to have little to no effect on a predictive model. The low quality features may include, for instance, features with a low correlation to a predictive outcome and/or features with a low entropy measure. Forward selection is then performed iteratively over each of the filtered feature subsets in an order corresponding to the semantic class rankings. In other words, forward selection is first performed over a filtered feature subset corresponding to a highest ranked semantic class, then performed over a filtered feature subset corresponding to the next highest ranked semantic class, and so on until all filtered feature subsets have been processed. The process outputs a reduced feature set that includes features selected by the forward selection iterations. Features from the reduced feature set are then used to generate a predictive model, which may be used to generate predictions given certain input information.

The semantic classification-based feature selection described herein can be thought of as using expert knowledge to regularize the feature selection process. When performing feature selection, there is always the risk of performance degrading (i.e., selecting suboptimal features). By using expert knowledge to provide semantic classes in a ranked order, embodiments perform forward selection first on features which are likely to be more influential on predictive capabilities, thereby increasing the likelihood of selecting these influential features while reducing the likelihood of selecting inferior features.

There is no guarantee that the features in the top ranked semantic classes are good for all predictive tasks. Accordingly, it is possible that no features in the first, second, or other semantic class are influential and thus should not be selected. However, if only semantic class-based forward selection is employed, at least one feature is always selected from the first semantic class, although the selected feature may not be good for the current predictive task. For this reason, generative filtering is performed before doing forward selection. Depending on the predication task, all features from the top semantic class may be filtered in some cases. The filtering step incurs some extra computation, but much less than forward selection itself. Accordingly, not only does the filtering step help prevent the selection of inferior features, it also reduces computation since the number of candidate features is decreased.

With reference now to the drawings, FIG. 1 is a block diagram illustrating an exemplary system 100 for selecting a reduced feature set for use in generating a predictive model in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a feature selection engine 104 configured to receive an original feature set 102 as input and output a reduced feature set 106. The reduced feature set 106 is then processed by a model building engine 120 to generate a predictive model 122. The feature selection engine 104 and model building engine 120 may be provided, for instance, by an online marketing tool, such as the ADOBE ANALYTICS marketing tool (available from Adobe Systems Inc. of San Jose, California) to perform predictive capabilities for digital marketing. The components shown in FIG. 1 can be implemented on a computing device, such as the computing device 500 shown in FIG. 5.

The original feature set 102 includes a listing of features from a relevant dataset. In the context of digital marketing, the features relate to attributes of customers found in a customer dataset. A semantic classifier 108 divides the original feature set 102 into a number of feature subsets, such as feature subsets 112A, 112B, . . . 112N shown in FIG. 1. It should be understood that a feature set may be divided into any number of feature subsets within the scope of embodiments of the present invention. Generally, each feature subset corresponds to a different semantic class.

In the context of digital marketing, based on the experience of dealing with a large number of customer datasets, the inventors have observed that there is a direct relationship on how customers behave with respect to prediction outputs (for example, conversion, revenue etc.) and the segments to which the customers belong. For example, it is extremely reasonable to expect a direct link between a customer purchasing a certain product and the customer's age, gender, or geo location. Thus, these traits tend to clearly segment the customer population. Traits regarding the computing device used by customers to access online marketing resources (e.g., browsers, operating systems and screen type) also segment the customer population relatively well. Thus, a semantic classification of features helps in categorizing features based on their likelihood to segment a customer population, which in turn has a direct impact on the predictive power of the feature set used to build predictive models with regard to prediction outputs like conversion or revenue.

Accordingly, embodiments employ a number of semantic classes for grouping features from the original feature set 102 into the feature subsets 112A, 112B, . . . 112N. The semantic classes are ordered based on their likelihood of segmenting a customer population. In some embodiments, the semantic classes employed (in ranked order) include: customer traits, customer source, social channels, customer actions, temporal features, and miscellaneous.

Customer traits comprise features regarding the demographics of a customer, such as age, gender, geo location, and language. Based on experience, the inventors identified that it is reasonable to expect customers to react to offers and various campaigns depending on their demographics. Hence, these features have a very high likelihood of segmenting the customer population with respect to a metric like conversion or revenue. As a result, some embodiments assign a rank 1 (top rank) to the customer traits semantic class.

Customer source comprises features regarding the computing device used by customer to access online marketing resources, such as the browser used, operating system used, mobile or desktop device, etc. Based on experience, the inventors identified that it is reasonable to expect customers using different sources to access online resources (e.g., mobile versus desktop) to react differently to various offers and campaigns. As a result, some embodiments consider customer source as the next best semantic class for segmenting a customer population with regard to metrics like conversion and revenue. Accordingly, some embodiments assign a rank 2 to the customer source semantic class.

Customer segmentation also happens based on the social channel used by customers. A customer's behavior might vary with regard to a metric depending on the social channel (e.g., the FACEBOOK, TWITTER, GOOGLE PLUS social networks) via which the customer interacts with marketing resources. This is indicative of the customer's preference for a certain social media platform, and customers might respond very differently to the same campaign on different platforms. Accordingly, some embodiments assign a rank 3 to the social channels semantic class.

Customer populations may also be segmented based on various customer actions. Features capturing information about various customer actions like click, view, download, purchase, additions, removal, and search fall under this category. Sometimes, it is possible to detect a clear segment for some of the customer actions. For example, a feature like "last click tactic before purchase," which describes the form of a marketing campaign (e.g., banner ad, social, email, etc.) that was clicked by the customer before finally purchasing the product, may show clear segmentation of the customer population. Accordingly, some embodiments assign a rank 4 to the customer actions semantic class.

Temporal features describe some aspect regarding time. Some of the features in this semantic class may facilitate customer segmentation. For example, it is reasonable to expect seasonal trends in customer behavior. Thus, features describing seasons (summer, winter, spring etc.) have an impact on customer segmentation in case of an apparel dataset. This may be especially true for temporal dimensions describing annual events. Accordingly, some embodiments assign a rank 5 to the temporal features semantic class.

Finally, some features may not fall into any of the above five semantic classes. Accordingly, a miscellaneous semantic class may be employed to captures these features. In some embodiments, a rank 6 is assigned to the miscellaneous semantic class.

It should be understood that the semantic classes and the specific ranking of the semantic classes described above are provided by way of example only and not limitation. Various embodiments of the present invention may use semantic classes not described above and/or may exclude some of the semantic classes described above. Additionally, an alternative ordering of the semantic classes may be employed. Any and all such variations are contemplated to be within the scope of embodiments of the present invention.

As noted previously, each of the feature subsets 112A, 112B, . . . 112N corresponds with one of the semantic classes. The semantic classifier 108 segments features from the original feature set 102 into the feature subsets 112A, 112B, . . . 112N using any of a number of different classification approaches. In one particular embodiment, the semantic classifier 108 employs a dictionary-based approach for classifying the features from the original feature set into semantic classes to generate the feature subsets 112A, 112B, . . . 112N. In particular, a dictionary is provided that includes a set of keywords for each semantic class. The dictionary may be designed, for instance, by looking at various customer datasets and literature regarding digital marketing, such as digital marketing glossaries, to select keywords for each semantic class. By way of example only and not limitation, the keywords for the customer traits semantic class include: age, gender, city, country, geo, longitude, latitude, and region; the keywords for customer source include: browser, operating system, operating system (OS), and mobile; the keywords for the campaign source semantic class include: banner, blog, email, social, and search; the keywords for the social channels semantic class include: facebook, youtube, twitter, and yahoo; the keywords for the customer actions semantic class include: searched, click, view, touch, order, visit, download, launch, clickthrough, find, addition, removal, checkout, exit, signup, share, review, entry, spent, abandon, and purchase; and the keywords for the temporal semantic class include: after, annual, before, biennial, calendar, year, time, day, decade, delay, early, fiscal, fortnight, future, hour, later, minute, month, night, annum, period, premature, quarter, second, schedule, season, and next.

The feature name of each feature is compared against the keywords associated with the semantic classes. If the feature name of a feature matches a keyword from the set of keywords for a particular semantic class, the feature is assigned to the feature subset corresponding to that semantic class. For example, suppose that the keyword "click" is included in the set of keywords for the customer actions semantic class. The presence of "click" in a feature name would cause that feature to be included in the feature subset for the customer actions semantic class.

In some instances, a feature could be classified into more than one semantic class. For instance, a feature directed to "mobile purchase" could be classified into the customer source semantic class and customer actions semantic class (i.e., "mobile" is classified into the customer source semantic class, and "purchase" is classified into the customer actions semantic class). Both the semantic classes make sense in this example. To address this situation, some embodiments place a feature classified into more than one semantic class into the feature subset corresponding to the highest ranked semantic class to which it corresponds. In the example of "mobile purchase," the feature would be placed in the feature subset for the customer source semantic class since it is ranked higher than the customer actions semantic class.

As the keywords in the dictionary can occur in various forms in feature names, some embodiments use a stemmer before comparing a word in the feature name to a keyword. For example, suppose a feature includes the word "clicked." Before comparing to keywords in the dictionary, the word "clicked" is stemmed to get the word click and then a comparison is made to identify the visitor actions semantic class.

A generative filter 114 operates to remove, from the feature subsets 112A, 112B, . . . 112N, features that would likely not perform well for the current prediction task for which the reduced feature set 106 is being used. Generally, for each of the feature subsets 112A, 112B, . . . 112N, the generative filter 114 calculates a feature quality score for each feature and removes low quality features to provide filtered feature subsets 116A, 116B, . . . 116N. A low quality feature may comprise a feature that has a feature quality score below a threshold score. In embodiments, the threshold score may be empirically set.

The generative filter 114 may use any of a number of filtering techniques to remove low quality features. In some embodiments, the generative filter 114 employs a correlation filter and/or an entropy measure to identify low quality features to remove.

A correlation filter uses existing customer data to determine the correlation between each feature and an outcome corresponding to the current prediction task (e.g., the likelihood a customer will purchase a product). The correlation for a given feature may be determined using a first feature vector from the customer data that represents whether each customer exhibits the feature and a second feature vector from the customer data the represents whether each customer exhibited the outcome corresponding to the current prediction task (e.g., whether each customer purchased a product). A correlation is then computed between the two feature vectors. Features having a low correlation can be filtered out.

An entropy measure reflects the amount of variance of a feature among customers seen in the customer data. For instance, a feature has low entropy if a large percentage of the customers have the same feature. In contrast, a feature has high entropy if there is a lot of variability in the feature among customers. When a feature has low entropy, the feature will have a low impact on prediction. Therefore, features having low entropy can be filtered out.

A forward selection module 118 employs forward selection to select features from the filtered feature subsets 116A, 116B, . . . 116N for inclusion in the reduced feature set 106. The forward selection module iterates through each of the filtered feature subsets 116A, 116B, . . . 116N in the order of the semantic classes with which the filtered features subsets 116A, 116B, . . . 116N correspond. For example, suppose six semantic classes are used for a prediction in digital marketing and the semantic classes as ordered as follows: customer traits, customer source, social channel, customer actions, temporal, and miscellaneous. The forward selection module 106 performs forward selection first on the filtered feature subset corresponding to the customer traits semantic class, then forward selection on the filtered feature subset corresponding to the customer source semantic class, then forward selection on the filtered feature subset corresponding to the social channels semantic class, then forward selection on the filtered feature subset corresponding to the customer actions semantic class, then forward selection on the filtered feature subset corresponding to the temporal semantic class, and finally forward selection on the filtered feature subset corresponding to the miscellaneous semantic class.

Forward selection is performed on each filtered feature subset using forward selection techniques known in the art. Generally, features are selected in a stepwise fashion. Each iteration of forward selection on a given filtered feature subset includes testing the addition of each remaining feature in the filtered feature subset with any previously selected features (including features selected from previously-considered filtered feature subsets, if any) to determine which remaining feature best improves the predictive capability of the predictive model being built (e.g., using a known model comparison criteria, such as the Akaike information criterion or the Bayesion information criterion). The feature that best improves the predictive model (if any) is added to the group of selected features. This process of selecting a best feature is continued until none of the remaining features from the current filtered feature subset improves the predictive model. This could include stopping when the improved performance is minimal or below some threshold. Forward selection on a given filtered feature subset could result in zero, one, or multiple features being selected from that filtered feature subset.

The forward selection module 118 outputs the reduced feature set 106 after iterating through each of the filtered feature subsets 116A, 116B, . . . 116N. The reduced feature set 106 is used by a model building module 120 to generate a predictive model 122. The predictive model 122 is then employed to provide predictive capabilities given new customer data. For example, the predictive model 122 could be built to identify customers who are likely to purchase a given product. Accordingly, the predictive model 122 could be provided information regarding a customer or group of customers to determine the likelihood of each customer purchasing the product.

While FIG. 1 illustrates an embodiment in which the generative filter 114 operates on the feature subsets 112A, 112B, . . . 112N, in some configurations, the generative filter 114 may be used before the semantic classifier 108 to filter out features from the original feature set 102. In such configurations, the semantic classifier 108 would then operate to classify features not filtered out by the generative filter 114 to provide the filtered feature subsets 116A, 116B, . . . 116N.

In further embodiments, filtering is iteratively performed on the feature subsets 112A, 112B, . . . 112N in the order of the semantic classes with the forward selection. For instance, filtering and forward selection could be performed first on a feature subset corresponding to the highest ranked semantic class, then filtering and forward selection performed on a feature subset corresponding to the second highest ranked semantic class, and so on. In this configuration, the filtering performed on each feature subset can be varied. For instance, the filtering can be dependent on the number of features currently selected. By way of example to illustrate, suppose that a large number of features have been selected from the feature subsets corresponding to the first and second semantic classes. When processing the feature subset for the third semantic class, a higher filter threshold may be set to filter out more features. Alternatively, if very few features have been selected from the first two feature subsets, a lower filter threshold could be used to filter out fewer features. This may help to improve efficiency while ensuring that an effective set of features is selected.

Figure 2:
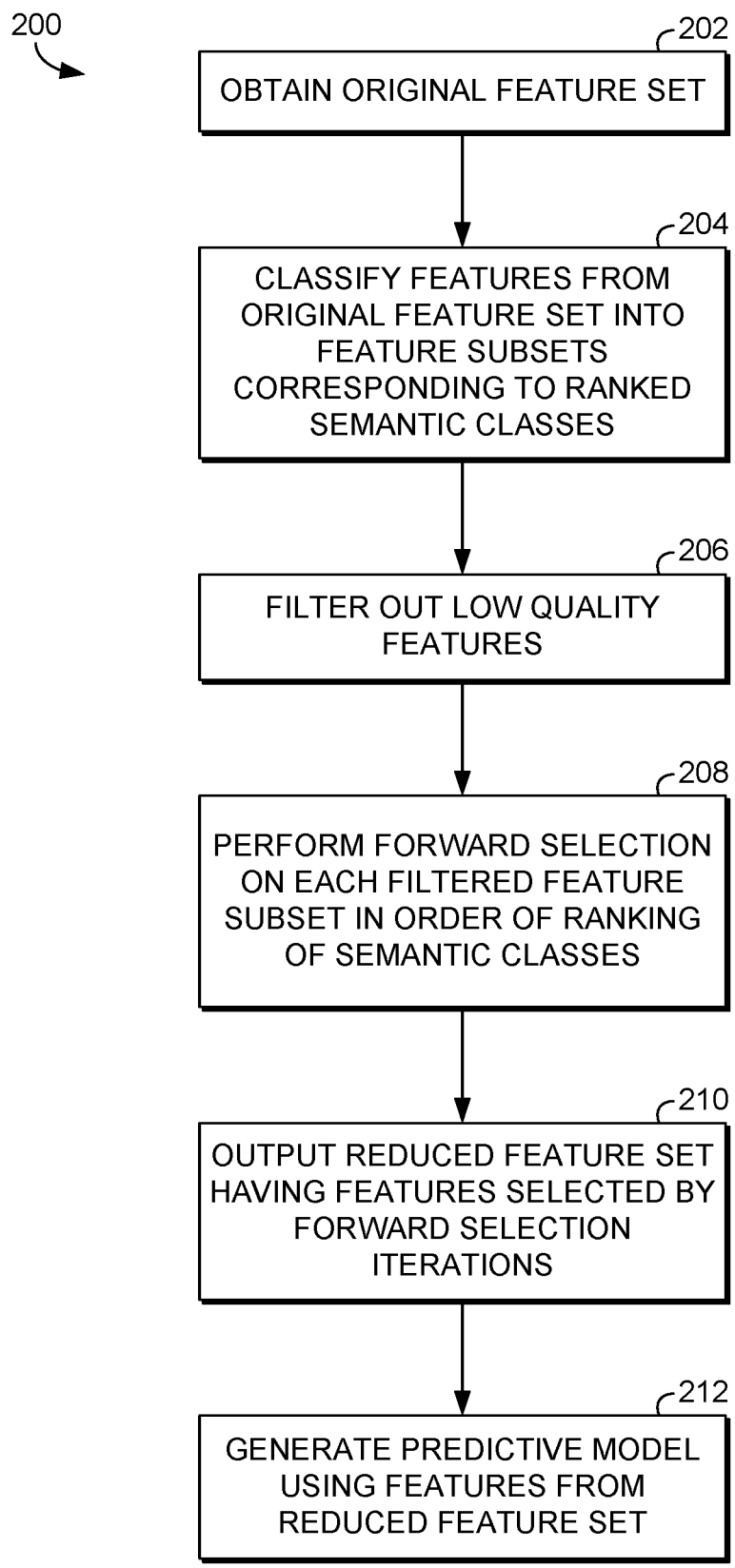
FIG. 2 is a flow diagram showing a method for selecting a reduced feature set and generating a predictive model using the reduced feature set in accordance with implementations of the present disclosure.

Referring to FIG. 2, a flow diagram is provided illustrating a method 200 for selecting a reduced feature set and generating a predictive model using the reduced feature set. Each block of the method 200 and any other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. The method 200 may be performed, for instance, by the feature selection engine 104 and model building engine 120 of FIG. 1.

Initially, as shown at block 202, an original feature set is obtained. In some embodiments, the original feature set includes all available features for the data set. In other embodiments, the original feature set includes only a selection of available features, such as a group of features initially selected by a user.

Features from the original feature set are classified into several feature subsets, as shown at block 204. Each feature subset corresponds with a particular semantic class. Any number of semantic classes may be used to generate the feature subsets. As discussed above, some embodiments use six semantic classes to group features in the digital marketing space, including customer traits, customer source, social channels, customer actions, temporal, and miscellaneous. In such embodiments, each feature from the original feature subset is classified into one of these six semantic classes.

In some embodiments, features are classified into the semantic classes using a dictionary-based approach in which a group of keywords is provided for each semantic class. A feature is then classified by comparing terms from the feature name for the feature against the keywords. When a term from the feature name matches a keyword for a particular semantic class, the feature is added to the feature subset for that semantic class.

As shown at block 206, low quality features are filtered out to remove these low quality features from consideration. Low quality features may be identified and filtered by computing a feature quality score for each feature and removing features with a low feature quality score (e.g., a feature quality score that does not satisfy a threshold score). Any of a variety of different known filtering techniques may be employed to generate the feature quality score and remove low quality features. For instance, some embodiments employ correlation filtering that filters out features having a low correlation to a desired output prediction and/or employ an entropy measure in which features with low entropy are filtered out.

As shown at block 208, forward selection is iteratively performed on each of the filtered feature subsets in an order corresponding to the ranking/ordering of the semantic classes. For instance, forward selection is performed first on the filtered feature subset corresponding to the highest ranked semantic class, forward selection is then performed on the filtered feature subset corresponding to the second highest ranked semantic class, and so on until forward selection has been performed on each of the filtered feature subsets. Each iteration adds zero, one, or more selected features. Accordingly, a forward selection iteration for a subsequent filtered feature subset considers selected features from previously processed filtered feature subsets, if any.

After forward selection has been performed on each of the filtered feature subsets, a reduced feature set is provided, as shown at block 210. The reduced feature set includes the collection of features selected from the forward selection iterations on the filtered feature subsets. The reduced feature set is then used to generate a predictive model, as shown at block 212. The predictive model may correspond with any desired predictive capability. The generation of predictive models from feature sets is well-known and therefore will not be described in further detail herein.

Although FIG. 2 illustrates the low quality features being filtered out after classifying features into feature subsets, it should be understood that the low quality features may first be filtered from the original feature set and the remaining features classified into subsets. Regardless of the order of operation, a number of filtered feature subsets are provided for forward selection. Additionally, as noted previously, in some configurations, filtering may be performed iteratively on feature subsets in the order of the semantic classes with the forward selection. This allows the filtering to be varied among the feature subsets, for instance, depending on the number of features selected from previous iterations. By way of specific example, Algorithm 1 below illustrates an approach that includes iteratively processing feature subsets by filtering features and performing forward selection from a subset during each iteration.

| Algorithm 1 |
|---|
| 1. Let S = { }, F = {set of original features} |
| 2. Classify F into subsets, F = {$F_1$, $F_2$,..., $F_n$}, using offline designed semantic based classifier. |
| 3. For i = 1 to n<br>   a. Compute feature quality for all features in $F_i$, remove low quality features, and form a new subset $F_i'$.<br>   b. Do forward selection from $F_i'$.<br>      i. Select the best feature f* from $F_i'$, meaning the model M*build using {S, f*} give the best performance among all models built using {S, f } for any f ∈ $F_i'$.<br>      ii. Check if M* is better than the previous model (built using S), by quality measures like AIC or BIC. If not, stop selection within this category and go to 3.<br>      iii. S = {S, f*}, remove f* from $F_i'$. |
| 4. Output S as the final set of selected features. |

FIGS. 3A-3D illustrate several use cases in accordance with various embodiments of the present invention. In a first use case shown in FIG. 3A, a user can choose to input nothing, and the system explores a feature set 302A that includes all available features from a data set. For instance, the feature set 302A includes 100 features ($F_1$-$F_{100}$). Feature selection in accordance with embodiments described herein is performed on the feature set 302A to provide a reduced feature set 304A. In the present example, four features ($F_7$, $F_{37}$, $F_{63}$, $F_{92}$) have been selected for the reduced feature set 304A. This approach may be best suited for a non-expert user since no user input selecting any features is needed.

Figure 3A:
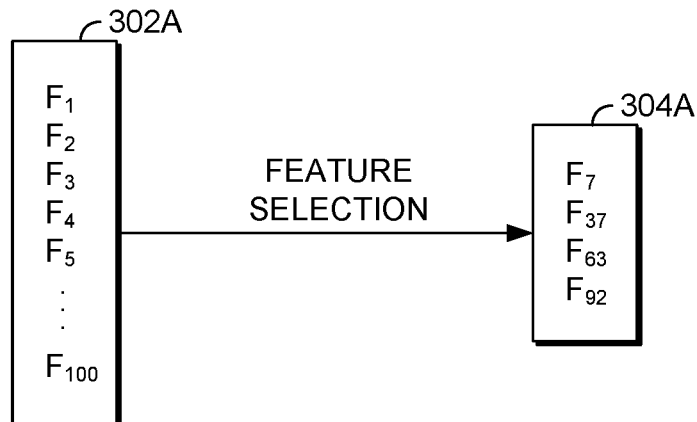
FIG. 3A-3D are block diagrams illustrating various use cases for selecting reduced feature sets in accordance with implementations of the present disclosure.
Figure 3B:
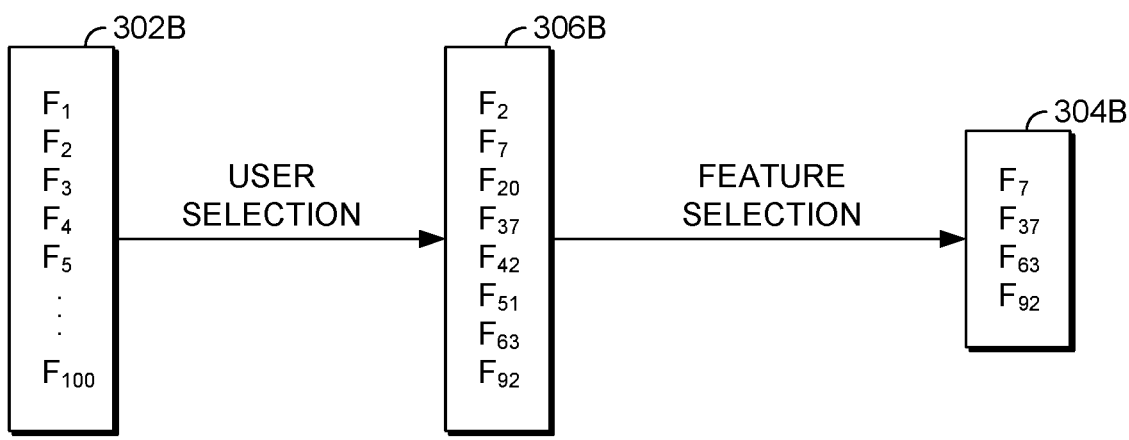

In another use case as illustrated by FIG. 3B, a user selects, from all available features 302B, a set of candidate features 306B which the user believes will provide a good predictive model. In the present example, the user has selected eight features ($F_2$, $F_7$, $F_{20}$, $F_{37}$, $F_{42}$, $F_{51}$, $F_{63}$, $F_{92}$) for the set of candidate features 306B. Feature selection in accordance with embodiments described herein is then performed on the set of candidate features 306B to provide a reduced feature set 304B.

Figure 3C:
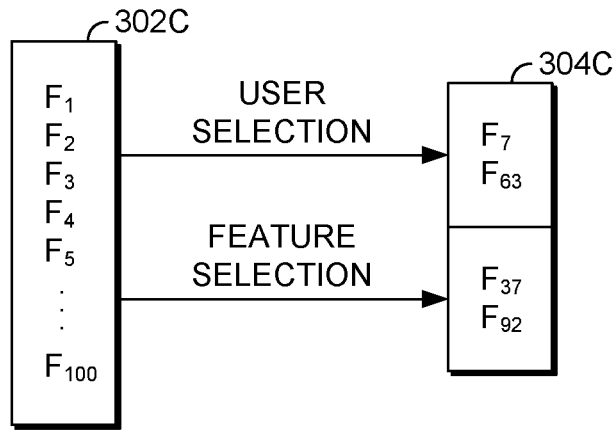

In a further use case as illustrated by FIG. 3C, a user selects, from a feature set 302C, features that are directly added to a reduced feature set 304C based on the user selections. In the present example, the user has selected to add features $F_7$ and $F_{63}$ directly to the reduced feature set 304C. Feature selection is then performed using embodiments described herein to select, from the remaining features in the feature set 302C, features to add to the reduced features set 304C in addition to the user-selected features. In such embodiments, forward selection is performed by selecting features to add in addition to the user-selected features.

Figure 3D:
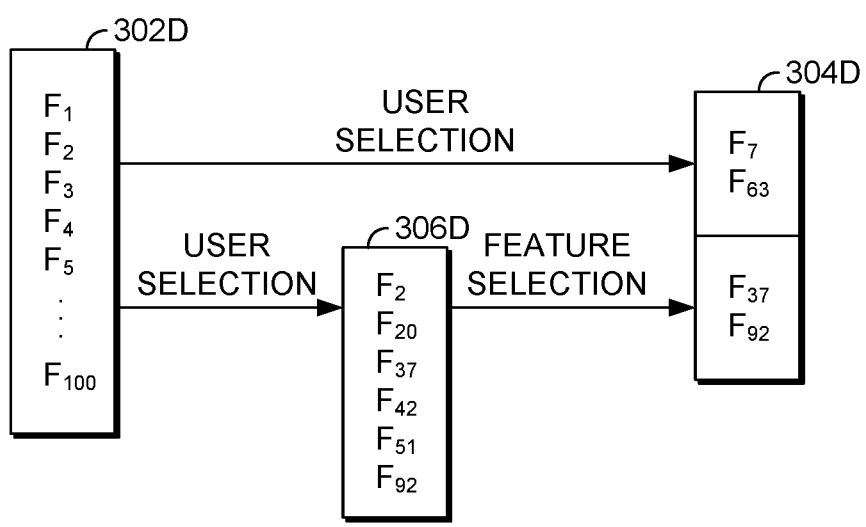

In still another use case as illustrated by FIG. 3D, a user selects, from a feature set 302D, both features that are directly added to a reduced feature set 304D ($F_7$ and $F_{63}$) and features that are added to a set of candidate features 306D ($F_2$, $F_{20}$, $F_{37}$, $F_{42}$, $F_{51}$, $F_{92}$). Feature selection is then performed using embodiments described herein to select, from the set of candidate features 306D, features to add to the reduced feature set 304D in addition to the features the user explicitly added to the reduced feature set 304D.

Figure 4:
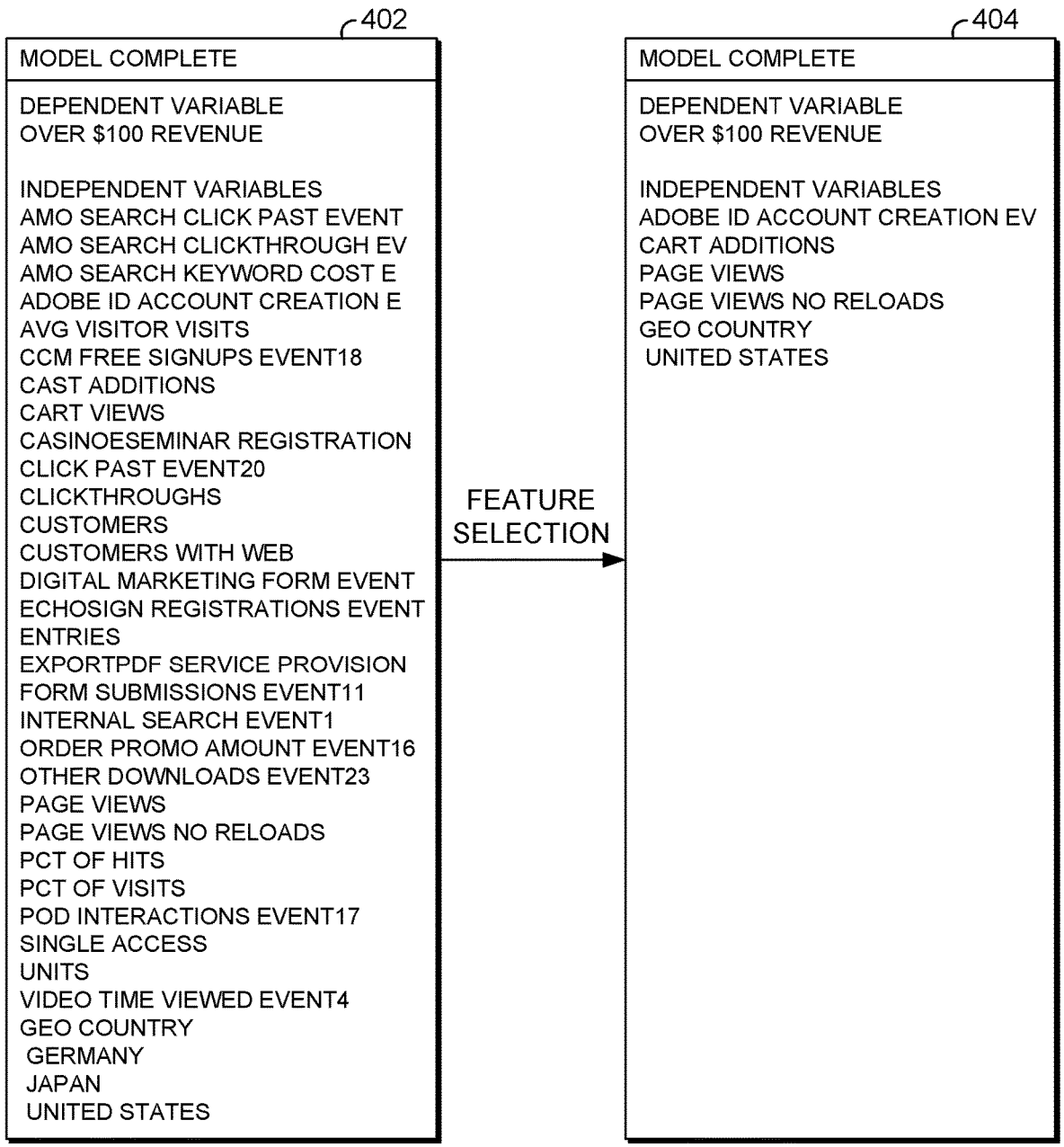
FIG. 4 includes displays showing features in an original feature set and a reduced feature set.

FIG. 4 provides a specific example illustrating a list of features 402 included in an original feature set. The list of features 402 shown in FIG. 4 is a partial list and other features not shown are also included in the original feature set. The features included are attributes regarding customers from a customer data set. As represented in FIG. 4, feature selection in accordance with embodiments described herein is performed on the original feature set in order to select features to include in a reduced feature set 404.

Figure 5:
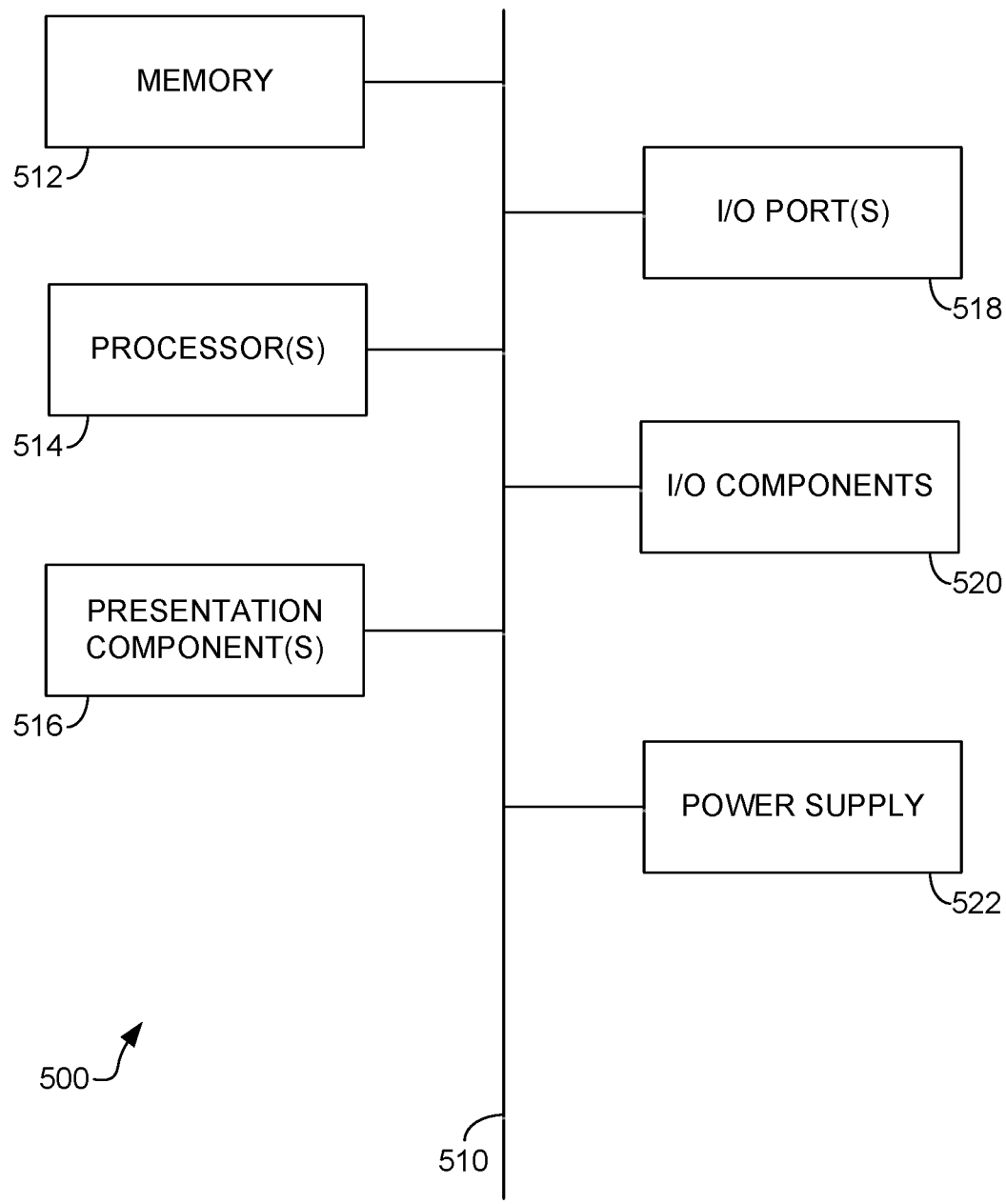
FIG. 5 is a block diagram of an exemplary computing environment suitable for use in implementations of the present disclosure.

Having described implementations of the present disclosure, an exemplary operating environment in which embodiments of the present invention may be implemented is described below in order to provide a general context for various aspects of the present disclosure. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes bus 510 that directly or indirectly couples the following devices: memory 512, one or more processors 514, one or more presentation components 516, input/output (I/O) ports 518, input/output components 520, and illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion.

As described above, implementations of the present disclosure relate to a feature selection approach that employs semantic classification and generative filtering in conjunction with forward selection to select features for reduced feature sets that are in turn used to build predictive models. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objectives set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-implemented method for generating a predictive model using a reduced feature set, the method comprising:
   obtaining, by a one or more processors, a set of features;
   classifying, by the one or more processors executing a semantic classifier, features of the set of features into feature subsets corresponding with semantic classes, the semantic classes being provided in a ranked order;
   selecting, by the one or more processors, features from the feature subsets to include in the reduced feature set, the features for the reduced feature set being selected by iterating through at least a portion of the feature subsets in the ranked order of the semantic classes, each iteration of a feature subset performed by the one or more processors:
      computing, by a generative filter of the one or more processors, a feature quality score for each feature in the feature subset to identify low quality features,
      removing, by the generative filter of the one or more processors, the low quality features from the feature subset to provide a filtered feature subset, and
      performing, by a forward selection module of the one or more processors, forward selection on the filtered feature subset, wherein the forward selection considers selected features from a previously processed filtered feature subset;
   outputting, by the one or more processors, the reduced feature set that includes the features selected using the forward selection; and
   generating, by the one or more processors, the predictive model using the features included in the reduced feature set.

2. The method of claim 1, wherein the set of features comprises features selected by a user from a larger set of features.

3. The method of claim 1, wherein the reduced feature set also includes one or more features specifically selected by a user for inclusion in the reduced feature set.

4. The method of claim 1, wherein classifying the features into feature subsets corresponding with the semantic classes comprises:
   comparing, by the one or more processors, a feature name of a first feature to keywords associated with each semantic class; and
   assigning, by the one or more processors, the first feature to a first semantic class based on the feature name of the first feature corresponding to at least one keyword associated with the first semantic class.

5. The method of claim 1, wherein the feature quality score for at least one feature is based at least in part on a correlation of the at least one feature to an outcome corresponding to a predictive task for which the predictive model is being generated.

6. The method of claim 1, wherein the feature quality score for at least one feature is determined using an entropy measure for the at least one feature, and wherein the low quality features comprise features whose feature quality score does not satisfy a predetermined score threshold.

7. The method of claim 1, wherein the forward selection of the filtered feature subset is stopped based on a performance threshold of the generated predictive model.

8. One or more computer storage media storing computer-useable instructions that, when executed by a computing device, causes the computing device to perform operations comprising:
   obtaining, by a one or more processors, a set of features;
   classifying, by the one or more processors executing a semantic classifier, features of the set of features into feature subsets corresponding with semantic classes, the semantic classes being provided in a ranked order;
   selecting, by the one or more processors, features from the feature subsets to include in the reduced feature set, the features for the reduced feature set being selected by iterating through at least a portion of the feature subsets in the ranked order of the semantic classes, each iteration of a feature subset performed by the one or more processors:
      computing, by a generative filter of the one or more processors, a feature quality score for each feature in the feature subset to identify low quality features,
      removing, by the generative filter of the one or more processors, the low quality features from the feature subset to provide a filtered feature subset, and
      performing, by a forward selection module of the one or more processors, forward selection on the filtered feature subset, wherein the forward selection considers selected features from a previously processed filtered feature subset;

outputting, by the one or more processors, the reduced feature set that includes the features selected using the forward selection; and generating, by the one or more processors, the predictive model using the features included in the reduced feature set.

9. The media of claim 8, wherein the set of features comprises features selected by a user from a larger set of features.

10. The media of claim 8, wherein the reduced feature set also includes one or more features specifically selected by a user for inclusion in the reduced feature set.

11. The media of claim 8, wherein classifying the features into feature subsets corresponding with the semantic classes comprises:
    comparing, by the one or more processors, a feature name of a first feature to keywords associated with each semantic class; and
    assigning, by the one or more processors, the first feature to a first semantic class based on the feature name of the first feature corresponding to at least one keyword associated with the first semantic class.

12. The media of claim 8, wherein the feature quality score for at least one feature is based at least in part on a correlation of the at least one feature to an outcome corresponding to a predictive task for which the predictive model is being generated.

13. The media of claim 8, wherein the feature quality score for at least one feature is determined using an entropy measure for the at least one feature, and wherein the low quality features comprise features whose feature quality score does not satisfy a predetermined score threshold.

14. The media of claim 8, wherein the forward selection of the filtered feature subset is stopped based on a performance threshold of the generated predictive model.

15. A computer system comprising:
    one or more processors; and
    one or more computer storage media storing computer useable instructions to cause the one or more processors to:
        obtain, by a one or more processors, a set of features;
        classify, by the one or more processors executing a semantic classifier, features of the set of features into feature subsets corresponding with semantic classes, the semantic classes being provided in a ranked order;
        select, by the one or more processors, features from the feature subsets to include in the reduced feature set, the features for the reduced feature set being selected by iterating through at least a portion of the feature subsets in the ranked order of the semantic classes, each iteration of a feature subset performed by the one or more processors:
            computing, by a generative filter of the one or more processors, a feature quality score for each feature in the feature subset to identify low quality features,
            removing, by the generative filter of the one or more processors, the low quality features from the feature subset to provide a filtered feature subset, and
            performing, by a forward selection module of the one or more processors, forward selection on the filtered feature subset, wherein the forward selection considers selected features from a previously processed filtered feature subset;
        output, by the one or more processors, the reduced feature set that includes the features selected using the forward selection; and
        generate, by the one or more processors, the predictive model using the features included in the reduced feature set.

16. The system of claim 15, wherein the set of features comprises features selected by a user from a larger set of features.

17. The system of claim 15, wherein classifying the features into feature subsets corresponding with the semantic classes comprises:
    comparing, by the one or more processors, a feature name of a first feature to keywords associated with each semantic class; and
    assigning, by the one or more processors, the first feature to a first semantic class based on the feature name of the first feature corresponding to at least one keyword associated with the first semantic class.

18. The system of claim 15, wherein the feature quality score for at least one feature is based at least in part on a correlation of the at least one feature to an outcome corresponding to a predictive task for which the predictive model is being generated.

19. The system of claim 15, wherein the feature quality score for at least one feature is determined using an entropy measure for the at least one feature, and wherein the low quality features comprise features whose feature quality score does not satisfy a predetermined score threshold.

20. The system of claim 15, wherein the forward selection of the filtered feature subset is stopped based on a performance threshold of the generated predictive model.

* * * * *